United States Patent
Wu et al.

(10) Patent No.: US 10,299,111 B2
(45) Date of Patent: May 21, 2019

(54) ANTENNA INFORMATION SENDING METHOD AND DEVICE, AND ANTENNA INFORMATION RECEIVING METHOD AND DEVICE

(71) Applicant: Huawei Technologies Co., Ltd., Shenzhen (CN)

(72) Inventors: Ye Wu, Shanghai (CN); Xiaoyan Bi, Shanghai (CN); Deli Qiao, Shenzhen (CN); Dageng Chen, Shanghai (CN); Rongdao Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 12 days.

(21) Appl. No.: 15/445,575

(22) Filed: Feb. 28, 2017

(65) Prior Publication Data

US 2017/0171740 A1 Jun. 15, 2017

Related U.S. Application Data

(63) Continuation of application No. PCT/CN2014/085642, filed on Aug. 30, 2014.

(51) Int. Cl.
*H04W 8/24* (2009.01)
*H04W 76/27* (2018.01)
(Continued)

(52) U.S. Cl.
CPC ............ *H04W 8/24* (2013.01); *H04B 7/0404* (2013.01); *H04B 7/0693* (2013.01);
(Continued)

(58) Field of Classification Search
None
See application file for complete search history.

(56) References Cited

U.S. PATENT DOCUMENTS 8,437,319 B2 * 5/2013 Kwon ............... H04W 8/24
370/254
8,605,614 B2 * 12/2013 Nishio ............... H04L 5/0028
370/252

(Continued)

FOREIGN PATENT DOCUMENTS

CN 102348289 A 2/2012
CN 102415180 A 4/2012
(Continued)

OTHER PUBLICATIONS

3rd Generation Partnership Project; Technical Specification Group Radio Access Network; Evolved Universal Terrestrial Radio Access (E-UTRA); User Equipment (UE) Radio Access Capabilities (Release 12), 3GPP TS 36.306 V12.1.0 (Jun. 2014), 30 pages.

*Primary Examiner* — Jamaal R Henson
(74) *Attorney, Agent, or Firm* — Slater Matsil, LLP

(57) ABSTRACT

Embodiments disclose an antenna information sending method and device, and an antenna information receiving method and device. The method includes: obtaining first antenna information of a terminal device, where the first antenna information includes at least one or more of a maximum number of layers for uplink spatial multiplexing that are supported by the terminal device, an antenna number supported by the terminal device, or whether the terminal device supports smart switch on/off of UE's antenna ports. The method also includes sending the first antenna information to a base station. In this way, the terminal device can control, according to a service requirement of the terminal device, an antenna deployed on the terminal device, and report antenna information of the terminal device to the base station in a timely manner.

16 Claims, 5 Drawing Sheets

(51) Int. Cl.
*H04W 72/04* (2009.01)
*H04W 74/08* (2009.01)
*H04B 7/0404* (2017.01)
*H04B 7/06* (2006.01)
*H04L 5/00* (2006.01)

(52) U.S. Cl.
CPC ..... *H04W 72/048* (2013.01); *H04W 72/0413* (2013.01); *H04W 74/0833* (2013.01); *H04W 76/27* (2018.02); *H04L 5/0023* (2013.01); *H04L 5/0092* (2013.01); *Y02D 70/1262* (2018.01); *Y02D 70/26* (2018.01); *Y02D 70/444* (2018.01)

(56) References Cited

U.S. PATENT DOCUMENTS

| | | | |
|---|---|---|---|
| 2012/0044898 A1* | 2/2012 | Ishii | H04W 52/146 370/329 |
| 2012/0184281 A1 | 7/2012 | Kim et al. | |
| 2012/0307648 A1* | 12/2012 | Okubo | H04W 72/06 370/241 |
| 2013/0010716 A1* | 1/2013 | Dinan | H04W 76/15 370/329 |
| 2013/0028239 A1* | 1/2013 | Dinan | H04W 72/042 370/336 |
| 2014/0092785 A1* | 4/2014 | Song | H04L 1/00 370/280 |
| 2015/0181560 A1* | 6/2015 | Jamadagni | H04B 7/2621 370/329 |

FOREIGN PATENT DOCUMENTS

| | | |
|---|---|---|
| CN | 102860061 A | 1/2013 |
| EP | 2943031 A1 | 11/2015 |
| WO | 2009034089 A1 | 3/2009 |
| WO | 2013013376 A1 | 1/2013 |
| WO | 2014117686 A1 | 8/2014 |

* cited by examiner

ANTENNA INFORMATION SENDING METHOD AND DEVICE, AND ANTENNA INFORMATION RECEIVING METHOD AND DEVICE

CROSS-REFERENCE TO RELATED APPLICATIONS

This application is a continuation of International Application No. PCT/CN2014/085642, filed on Aug. 30, 2014, the disclosure of which is hereby incorporated by reference in its entirety.

TECHNICAL FIELD

The present invention relates to the field of wireless communications technologies, and in particular, to an antenna information sending method and device, and an antenna information receiving method and device.

BACKGROUND

With the development of mobile communications technologies, great changes take place in people's production and life. A first-generation communications system implements a mobile two-way call by using an analog technology and a frequency division multiple access technology. By using a digital time division multiple access technology and a code division multiple access technology, a second-generation communications system improves call quality in the first-generation communications system and implements low-speed data transmission. A third-generation communications system and a fourth-generation communications system that subsequently appear not only improve call quality of a voice service, but also improve a data transmission speed.

In the third-generation communications system and the fourth-generation communications system, a multiple-input multiple-output (MIMO) technology is used.

A basic feature of the MIMO technology is using multiple transmit antennas and multiple receive antennas. Specifically, in the MIMO technology, multipath wireless communication, transmission, and receiving are regarded as an entirety. One manner is increasing a spatial dimension of data multiplexing, so that multiple portions of data space are multiplexed to a same time frequency resource. Another manner is sending same data on multiple transmit antennas and/or receiving same data by using multiple receive antennas, to obtain a control diversity gain. In this way, the MIMO technology increases a channel capacity without increasing bandwidth, thereby achieving a high communication capacity and high spectrum resource utilization.

However, the channel capacity linearly increases with an increase in an antenna number. To meet a requirement of the MIMO technology, a quantity of antennas configured on a terminal device increases from one antenna to four antennas or even more. Because the terminal device side transmits or receives data by using multiple antennas, compared with single input single output (SISO), not only calculation complexity increases when a quantity of channels used for transmitting data is estimated, but also complexity of selecting, by a base station, a channel for performing data transmission with the terminal device accordingly increases because of an increase in a quantity of antennas on the terminal device side. How to obtain antenna information of a terminal device in a timely manner becomes a problem that needs to be resolved.

SUMMARY

In view of this, embodiments of the present invention provide an antenna information sending method and device, and an antenna information receiving method and device, to resolve a problem of how to obtain antenna information of a terminal device in a timely manner.

According to a first aspect, an antenna information sending device is provided. The device includes an obtaining module, configured to obtain first antenna information, where the first antenna information includes at least one of a maximum number of layers for uplink spatial multiplexing that are supported by the terminal device, an antenna number supported by the terminal device, or whether the terminal device supports smart switch on/off of UE's antenna ports. The device also includes a sending module, configured to send the first antenna information to a base station, where the first antenna information is used by the base station to determine a transmission resource used for communicating with the terminal device.

With reference to the possible implementation manner of the first aspect, in a first possible implementation manner, the sending device further includes: a receiving module, configured to receive a capability query message sent by the base station, where the capability query message is used to request the terminal device to report capability information that includes the first antenna information.

With reference to the first possible implementation manner of the first aspect, in a second possible implementation manner, the capability information further includes transmission information; the obtaining module is further configured by the terminal device to obtain the transmission information, where the transmission information includes at least one of an uplink/downlink peak rate, a maximum uplink/downlink modulation order, or a maximum number of layers for downlink spatial multiplexing; and the sending module is further configured to send the transmission information to the base station.

With reference to the possible implementation manner of the first aspect, or with reference to the first possible implementation manner of the first aspect, or with reference to the second possible implementation manner of the first aspect, in a third possible implementation manner, the sending module is specifically configured to send radio resource control RRC signaling to the base station, where the RRC signaling carries the first antenna information.

With reference to the possible implementation manner of the first aspect, or with reference to the first possible implementation manner of the first aspect, or with reference to the second possible implementation manner of the first aspect, in a fourth possible implementation manner, the sending module is specifically configured to send the first antenna information to the base station by using a physical uplink shared channel PUSCH.

With reference to the possible implementation manner of the first aspect, or with reference to the first possible implementation manner of the first aspect, or with reference to the second possible implementation manner of the first aspect, in a fifth possible implementation manner, the sending module is specifically configured to send the first antenna information to the base station by using a physical random access channel PRACH.

With reference to the possible implementation manner of the first aspect, or with reference to the first possible implementation manner of the first aspect, or with reference to the second possible implementation manner of the first aspect, or with reference to the third possible implementation manner of the first aspect, or with reference to the fourth possible implementation manner of the first aspect, or with reference to the fifth possible implementation manner of the first aspect, in a sixth possible implementation manner, the obtaining module is further configured to obtain changed second antenna information when the first antenna information changes. The sending module is further configured to send the second antenna information to the base station.

With reference to the sixth possible implementation manner of the first aspect, in a seventh possible implementation manner, the sending device further includes an update message sending module, configured to: before the second antenna information is sent to the base station, send an update message to the base station when the first antenna information changes, where the update message is used to notify the base station that antenna information of the terminal device changes.

With reference to the sixth possible implementation manner of the first aspect, or with reference to the seventh possible implementation manner of the first aspect, in an eighth possible implementation manner, the second antenna information includes a changed antenna number. The sending module is specifically configured to: send a random access request to the base station, where the random access request carries the changed antenna number; or send random access to the base station, where the random access includes a random access sequence, and the random access sequence is determined according to the changed antenna number; or send the changed antenna number to the base station in a specified manner by using the physical uplink shared channel PUSCH.

With reference to the possible implementation manner of the first aspect, or with reference to the first possible implementation manner of the first aspect, or with reference to the second possible implementation manner of the first aspect, or with reference to the third possible implementation manner of the first aspect, or with reference to the fourth possible implementation manner of the first aspect, or with reference to the fifth possible implementation manner of the first aspect, or with reference to the sixth possible implementation manner of the first aspect, or with reference to the seventh possible implementation manner of the first aspect, or with reference to the eighth possible implementation manner of the first aspect, in a ninth possible implementation manner, the sending device is the terminal device.

According to a second aspect, an antenna information receiving device is provided. The device includes a receiving module, configured to receive first antenna information sent by a terminal device, where the first antenna information includes at least one of a maximum number of layers for uplink spatial multiplexing that are supported by the terminal device, an antenna number supported by the terminal device, or whether the terminal device supports smart switch on/off of UE's antenna ports. The device also includes a determining module, configured to determine, according to the received first antenna information, a transmission resource used for communicating with the terminal device. The device also a communications module, configured to communicate with the terminal device by using the transmission resource.

With reference to the possible implementation manner of the second aspect, in a first possible implementation manner, the receiving device further includes: a sending module, configured to send a capability query message to the terminal device, where the capability query message is used to request the terminal device to report capability information that includes the first antenna information.

With reference to the first possible implementation manner of the second aspect, in a second possible implementation manner, the capability information further includes transmission information of the terminal device. The receiving module is further configured to receive the transmission information sent by the terminal device, where the transmission information includes at least one of an uplink/downlink peak rate, a maximum uplink/downlink modulation order, or a maximum number of layers for downlink spatial multiplexing.

With reference to the possible implementation manner of the second aspect, or with reference to the first possible implementation manner of the second aspect, or with reference to the second possible implementation manner of the second aspect, in a third possible implementation manner, the receiving module is specifically configured to receive radio resource control RRC signaling sent by the terminal device, where the RRC signaling carries the first antenna information.

With reference to the possible implementation manner of the second aspect, or with reference to the first possible implementation manner of the second aspect, or with reference to the second possible implementation manner of the second aspect, in a fourth possible implementation manner, the receiving module is specifically configured to receive, by using a physical uplink shared channel PUSCH, the first antenna information sent by the terminal device.

With reference to the possible implementation manner of the second aspect, or with reference to the first possible implementation manner of the second aspect, or with reference to the second possible implementation manner of the second aspect, in a fifth possible implementation manner, the receiving module is specifically configured to: receive a random access request sent by the terminal device, and obtain, by using a physical random access channel PRACH, the first antenna information sent by the terminal device.

With reference to the possible implementation manner of the second aspect, or with reference to the first possible implementation manner of the second aspect, or with reference to the second possible implementation manner of the second aspect, or with reference to the third possible implementation manner of the second aspect, or with reference to the fourth possible implementation manner of the second aspect, or with reference to the fifth possible implementation manner of the second aspect, in a sixth possible implementation manner, the receiving module is further configured to receive second antenna information sent by the terminal device, where the second antenna information is sent by the terminal device when the first antenna information changes.

With reference to the sixth possible implementation manner of the second aspect, in a seventh possible implementation manner, the receiving module is specifically configured to receive update information sent by the terminal device, where the update information is used to notify the base station that antenna information of the terminal device changes; and the sending module is further configured to send the capability query message to the terminal device.

With reference to the sixth possible implementation manner of the second aspect, or with reference to the seventh possible implementation manner of the second aspect, in an eighth possible implementation manner, the second antenna information includes a changed antenna number; and the receiving module is specifically configured to: receive a random access request sent by the terminal device, where the random access request carries the changed antenna number; or receive random access sent by the terminal device, where the random access includes a random access sequence, and the random access sequence is determined according to the changed antenna number; or receive, by using the physical uplink shared channel PUSCH, the changed antenna number sent by the terminal device.

According to a third aspect, an antenna information sending device is provided. The device includes a processor, configured to obtain first antenna information, where the first antenna information includes at least one of a maximum number of layers for uplink spatial multiplexing that are supported by the terminal device, an antenna number supported by the terminal device, or whether the terminal device supports smart switch on/off of UE's antenna ports. The device also includes a signal transmitter, configured to send the first antenna information to a base station, where the first antenna information is used by the base station to determine a transmission resource used for communicating with the terminal device.

With reference to the possible implementation manner of the third aspect in a first possible implementation manner, the sending device further includes a signal receiver, configured to receive a capability query message sent by the base station, where the capability query message is used to request the terminal device to report capability information that includes the first antenna information.

With reference to the first possible implementation manner of the third aspect, in a second possible implementation manner, the capability information further includes transmission information; the processor is further configured to obtain the transmission information, where the transmission information includes at least one of an uplink/downlink peak rate, a maximum uplink/downlink modulation, or a maximum number of layers for downlink spatial multiplexing; and the signal transmitter is further configured to send the transmission information to the base station.

With reference to the possible implementation manner of the third aspect, or with reference to the first possible implementation manner of the third aspect, or with reference to the second possible implementation manner of the third aspect, in a third possible implementation manner, the signal transmitter is specifically configured to send radio resource control RRC signaling to the base station, where the RRC signaling carries the first antenna information.

With reference to the possible implementation manner of the third aspect, or with reference to the first possible implementation manner of the third aspect, or with reference to the second possible implementation manner of the third aspect, in a fourth possible implementation manner, the signal transmitter is specifically configured to send the first antenna information to the base station by using a physical uplink shared channel PUSCH.

With reference to the possible implementation manner of the third aspect, or with reference to the first possible implementation manner of the third aspect, or with reference to the second possible implementation manner of the third aspect, in a fifth possible implementation manner, the signal transmitter is specifically configured to send the first antenna information to the base station by using a physical random access channel PRACH.

With reference to the possible implementation manner of the third aspect, or with reference to the first possible implementation manner of the third aspect, or with reference to the second possible implementation manner of the third aspect, or with reference to the third possible implementation manner of the third aspect, or with reference to the fourth possible implementation manner of the third aspect, or with reference to the fifth possible implementation manner of the third aspect, in a sixth possible implementation manner, the processor is further configured to obtain changed second antenna information when the first antenna information changes; and the signal transmitter is further configured to send the second antenna information to the base station.

With reference to the sixth possible implementation manner of the third, in a seventh possible implementation manner, the signal transmitter is further configured to: before the second antenna information is sent to the base station, send an update message to the base station when the first antenna information changes, where the update message is used to notify the base station that antenna information of the terminal device changes.

With reference to the sixth possible implementation manner of the third aspect, or with reference to the seventh possible implementation manner of the third aspect, in an eighth possible implementation manner, the second antenna information includes a changed antenna number; and the signal transmitter is specifically configured to: send a random access request to the base station, where the random access request carries the changed antenna number; or send random access to the base station, where the random access includes a random access sequence, and the random access sequence is determined according to the changed antenna number; or send the changed antenna number to the base station in a specified manner by using the physical uplink shared channel PUSCH.

With reference to the possible implementation manner of the third aspect, or with reference to the first possible implementation manner of the third aspect, or with reference to the second possible implementation manner of the third aspect, or with reference to the third possible implementation manner of the third aspect, or with reference to the fourth possible implementation manner of the third aspect, or with reference to the fifth possible implementation manner of the third aspect, or with reference to the sixth possible implementation manner of the third aspect, or with reference to the seventh possible implementation manner of the third aspect, or with reference to the eighth possible implementation manner of the third aspect, in a ninth possible implementation manner, the sending device is the terminal device.

According to a fourth aspect, an antenna information receiving device is provided. The device includes a signal receiver, configured to receive first antenna information sent by a terminal device, where the first antenna information includes at least one of a maximum number of layers for uplink spatial multiplexing that are supported by the terminal device, an antenna number supported by the terminal device, or whether the terminal device supports smart switch on/off of UE's antenna ports. The device also includes a processor, configured to: determine, according to the received first antenna information, a transmission resource used for communicating with the terminal device; and communicate with the terminal device by using the transmission resource.

With reference to the possible implementation manner of the fourth aspect, in a first possible implementation manner, the receiving device further includes a signal sending module, where the signal sending module is configured to send a capability query message to the terminal device, where the capability query message is used to request the terminal device to report capability information that includes the first antenna information.

With reference to the first possible implementation manner of the fourth aspect, in a second possible implementation manner, the capability information further includes transmission information of the terminal device. The signal receiver is further configured to receive the transmission information sent by the terminal device, where the transmission information includes at least one of an uplink/downlink peak rate, a maximum uplink/downlink modulation, or a maximum number of layers for downlink spatial multiplexing.

With reference to the possible implementation manner of the fourth aspect, or with reference to the first possible implementation manner of the fourth aspect, or with reference to the second possible implementation manner of the fourth aspect, in a third possible implementation manner, the signal receiver is specifically configured to receive radio resource control RRC signaling sent by the terminal device, where the RRC signaling carries the first antenna information.

With reference to the possible implementation manner of the fourth aspect, or with reference to the first possible implementation manner of the fourth aspect, or with reference to the second possible implementation manner of the fourth aspect, in a fourth possible implementation manner, the signal receiver is specifically configured to receive, by using a physical uplink shared channel PUSCH, the first antenna information sent by the terminal device.

With reference to the possible implementation manner of the fourth aspect, or with reference to the first possible implementation manner of the fourth aspect, or with reference to the second possible implementation manner of the fourth aspect, in a fifth possible implementation manner, the signal receiver is specifically configured to: receive a random access request sent by the terminal device, and obtain, by using a physical random access channel PRACH, the first antenna information sent by the terminal device.

With reference to the possible implementation manner of the fourth aspect, or with reference to the first possible implementation manner of the fourth aspect, or with reference to the second possible implementation manner of the fourth aspect, or with reference to the third possible implementation manner of the fourth aspect, or with reference to the fourth possible implementation manner of the fourth aspect, or with reference to the fifth possible implementation manner of the fourth aspect, in a sixth possible implementation manner, the signal receiver is further configured to receive second antenna information sent by the terminal device, where the second antenna information is sent by the terminal device when the first antenna information changes.

With reference to the sixth possible implementation manner of the fourth aspect, in a seventh possible implementation manner, the signal receiver is further configured to receive update information sent by the terminal device, where the update information is used to notify the base station that antenna information of the terminal device changes; and send the capability query message to the terminal device.

With reference to the sixth possible implementation manner of the fourth aspect, or with reference to the seventh possible implementation manner of the fourth aspect, in an eighth possible implementation manner, the second antenna information includes a changed antenna number. The signal receiver is specifically configured to: receive a random access request sent by the terminal device, where the random access request carries the changed antenna number; or receive random access sent by the terminal device, where the random access includes a random access sequence, and the random access sequence is determined according to the changed antenna number; or receive, by using the physical uplink shared channel PUSCH, the changed antenna number sent by the terminal device.

According to a fifth aspect, an antenna information sending method is provided. The method includes obtaining, by a terminal device, first antenna information, where the first antenna information includes at least one of a maximum number of layers for uplink spatial multiplexing that are supported by the terminal device, an antenna number supported by the terminal device, or whether the terminal device supports smart switch on/off of UE's antenna ports. The method also includes sending, by the terminal device, the first antenna information to a base station, where the first antenna information is used by the base station to determine a transmission resource used for communicating with the terminal device.

With reference to the possible implementation manner of the fifth aspect, in a first possible implementation manner, the method further includes receiving, by the terminal device, a capability query message sent by the base station, where the capability query message is used to request the terminal device to report capability information that includes the first antenna information.

With reference to the first possible implementation manner of the fifth aspect, in a second possible implementation manner, the capability information further includes transmission information. The method further includes: obtaining, by the terminal device, the transmission information, where the transmission information includes at least one of an uplink/downlink peak rate, a maximum uplink/downlink modulation, or a maximum number of layers for downlink spatial multiplexing. The method also includes sending, by the terminal device, the transmission information to the base station.

With reference to the possible implementation manner of the fifth aspect, or with reference to the first possible implementation manner of the fifth aspect, or with reference to the second possible implementation manner of the fifth aspect, in a third possible implementation manner, the sending, by the terminal device, the first antenna information to a base station includes sending, by the terminal device, radio resource control RRC signaling to the base station, where the RRC signaling carries the first antenna information.

With reference to the possible implementation manner of the fifth aspect, or with reference to the first possible implementation manner of the fifth aspect, or with reference to the second possible implementation manner of the fifth aspect, in a fourth possible implementation manner, the sending, by the terminal device, the first antenna information to a base station includes sending, by the terminal device, the first antenna information to the base station by using a physical uplink shared channel PUSCH.

With reference to the possible implementation manner of the fifth aspect, or with reference to the first possible implementation manner of the fifth aspect, or with reference to the second possible implementation manner of the fifth aspect, in a fifth possible implementation manner, the sending, by the terminal device, the first antenna information to a base station includes sending, by the terminal device, the first antenna information to the base station by using a physical random access channel PRACH.

With reference to the possible implementation manner of the fifth aspect, or with reference to the first possible implementation manner of the fifth aspect, or with reference to the second possible implementation manner of the fifth aspect, or with reference to the third possible implementation manner of the fifth aspect, or with reference to the fourth possible implementation manner of the fifth aspect, or with reference to the fifth possible implementation manner of the fifth aspect, in a sixth possible implementation manner, the method further includes obtaining, by the terminal device, changed second antenna information when the first antenna information of the terminal device changes; and sending the second antenna information to the base station.

With reference to the sixth possible implementation manner of the fifth aspect, in a seventh possible implementation manner, before the sending the second antenna information to the base station, the method further includes sending, by the terminal device, an update message to the base station when the first antenna information of the terminal device changes, where the update message is used to notify the base station that antenna information of the terminal device changes.

With reference to the sixth possible implementation manner of the fifth aspect, or with reference to the seventh possible implementation manner of the fifth aspect, in an eighth possible implementation manner, the second antenna information includes a changed antenna number; and the sending, by the terminal device, the second antenna information to the base station includes: sending, by the terminal device, a random access request to the base station, where the random access request carries the changed antenna number; or sending, by the terminal device, random access to the base station, where the random access includes a random access sequence, and the random access sequence is determined according to the changed antenna number; or sending the changed antenna number to the base station in a specified manner by using the physical uplink shared channel PUSCH.

According to a sixth aspect, an antenna information receiving method is provided. The method includes receiving first antenna information sent by a terminal device, where the first antenna information includes at least one of a maximum number of layers for uplink spatial multiplexing that are supported by the terminal device, an antenna number supported by the terminal device, or whether the terminal device supports smart switch on/off of UE's antenna ports. The method also includes determining, according to the received first antenna information, a transmission resource used for communicating with the terminal device. The method also includes communicating with the terminal device by using the transmission resource.

With reference to the possible implementation manner of the sixth aspect, in a first possible implementation manner, the method further includes sending a capability query message to the terminal device, where the capability query message is used to request the terminal device to report capability information that includes the first antenna information.

With reference to the first possible implementation manner of the sixth aspect, in a second possible implementation manner, the capability information further includes transmission information of the terminal device. The method further includes receiving the transmission information sent by the terminal device, where the transmission information includes at least one of an uplink/downlink peak rate, a maximum uplink/downlink modulation, or a maximum number of layers for downlink spatial multiplexing.

With reference to the possible implementation manner of the sixth aspect, or with reference to the first possible implementation manner of the sixth aspect, or with reference to the second possible implementation manner of the sixth aspect, in a third possible implementation manner, the receiving, by a base station, first antenna information sent by a terminal device includes receiving radio resource control RRC signaling sent by the terminal device, where the RRC signaling carries the first antenna information.

With reference to the possible implementation manner of the sixth aspect, or with reference to the first possible implementation manner of the sixth aspect, or with reference to the second possible implementation manner of the sixth aspect, in a fourth possible implementation manner, the receiving, by a base station, first antenna information sent by a terminal device includes receiving, by using a physical uplink shared channel PUSCH, the first antenna information sent by the terminal device.

With reference to the possible implementation manner of the sixth aspect, or with reference to the first possible implementation manner of the sixth aspect, or with reference to the second possible implementation manner of the sixth aspect, in a fifth possible implementation manner, the receiving, by a base station, first antenna information sent by a terminal device includes receiving a random access request sent by the terminal device, and obtaining, by using a physical random access channel PRACH, the first antenna information sent by the terminal device.

With reference to the possible implementation manner of the sixth aspect, or with reference to the first possible implementation manner of the sixth aspect, or with reference to the second possible implementation manner of the sixth aspect, or with reference to the third possible implementation manner of the sixth aspect, or with reference to the fourth possible implementation manner of the sixth aspect, or with reference to the fifth possible implementation manner of the sixth aspect, in a sixth possible implementation manner, the method further includes: receiving second antenna information sent by the terminal device, where the second antenna information is sent by the terminal device when the first antenna information changes.

With reference to the sixth possible implementation manner of the sixth aspect, in a seventh possible implementation manner, the receiving second antenna information sent by the terminal device includes receiving update information sent by the terminal device, where the update information is used to notify the base station that antenna information of the terminal device changes; and sending the capability query message to the terminal device.

With reference to the sixth possible implementation manner of the sixth aspect, or with reference to the seventh possible implementation manner of the sixth aspect, in an eighth possible implementation manner, the second antenna information includes a changed antenna number; and the receiving second antenna information sent by the terminal device includes: receiving a random access request sent by the terminal device, where the random access request carries the changed antenna number; or receiving random access sent by the terminal device, where the random access includes a random access sequence, and the random access sequence is determined according to the changed antenna number; or receiving, by using the physical uplink shared channel PUSCH, the changed antenna number sent by the terminal device.

According to the embodiments, first antenna information of a terminal device is obtained, where the first antenna information is used to represent a capability of currently using an antenna by the terminal device, and the first antenna information includes at least one or more of a maximum number of layers for uplink spatial multiplexing that are supported by the terminal device, an antenna number supported by the terminal device, or whether the terminal device supports smart switch on/off of UE's antenna ports; and the first antenna information is sent to a base station. In this way, the terminal device can control, according to a service requirement of the terminal device, an antenna deployed on the terminal device, and report antenna information of the terminal device to the base station in a timely manner. On one hand, the terminal device adaptively adjusts a quantity of used antennas, which effectively mitigates a problem of large power consumption and strong electromagnetic radiation of the terminal device caused by an increase in an antenna number. On the other hand, the base station can obtain the antenna information of the terminal device in a timely manner, determine quality of a channel between the base station and the terminal device according to the antenna information of the terminal device, and properly schedule a channel resource for a communications service initiated by the terminal device, which improves a capability of communication between the terminal device and the base station.

BRIEF DESCRIPTION OF THE DRAWINGS

For a more complete understanding of the present invention, and the advantages thereof, reference is now made to the following descriptions taken in conjunction with the accompanying drawings.

DETAILED DESCRIPTION OF ILLUSTRATIVE EMBODIMENTS

Figure 1:
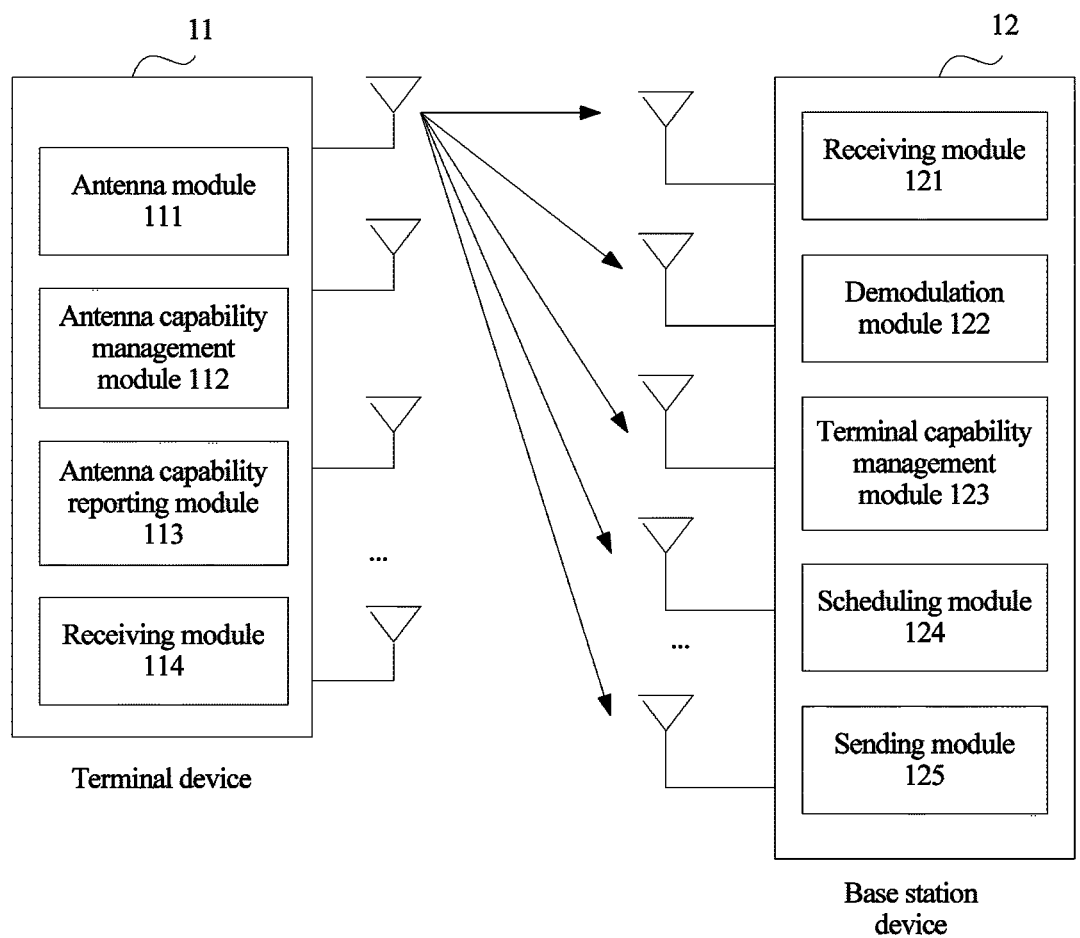
FIG. 1 is a schematic structural diagram of an antenna information sending and receiving system according to Embodiment 1 of the present invention.

To achieve an objective of the present invention, the embodiments of the present invention provide an antenna information sending method and device, and an antenna information receiving method and device. First antenna information of a terminal device is obtained, where the first antenna information includes at least one of a maximum number of layers for uplink spatial multiplexing that are supported by the terminal device, an antenna number supported by the terminal device, or whether the terminal device supports smart switch on/off of UE's antenna ports; and the first antenna information is sent to a base station. In this way, the terminal device can control, according to a service requirement of the terminal device, an antenna deployed on the terminal device, and report antenna information of the terminal device to the base station in a timely manner. On one hand, the terminal device adaptively adjusts a quantity of used antennas, which effectively mitigates a problem of large power consumption and strong electromagnetic radiation of the terminal device caused by an increase in an antenna number. On the other hand, the base station can obtain the antenna information of the terminal device in a timely manner, determine quality of a channel between the base station and the terminal device according to the antenna information of the terminal device, and properly schedule a channel resource for a communications service initiated by the terminal device, which improves a capability of communication between the terminal device and the base station.

It should be noted that this application provides description with reference to a terminal device and/or a base station.

The terminal device may be a wireless terminal or a wired terminal. The wireless terminal may refer to a communications device that provides a voice service and/or a data service, a handheld device with a wireless connection function, a wearable device, or another processing device connected to a wireless modem. The wireless terminal may communicate with one or more core networks through a Radio Access Network (RAN). The wireless terminal may be a mobile terminal, such as a mobile phone (or referred to as a "cellular" phone) and a computer with a mobile terminal. For example, the wireless terminal may be a portable, pocket-sized, handheld, wearable, computer built-in, or vehicle-mounted mobile apparatus, which exchanges voice and/or data with the radio access network. For example, the wireless terminal may be a device such as a personal communications service (PCS) phone, a cordless telephone set, a Session Initiation Protocol (SIP) phone, a Wireless Local Loop (WLL) station, or a Personal Digital Assistant (PDA). The wireless terminal may also be referred to as a system, a Subscriber Unit (SU), a Subscriber Station (SS), a Mobile Station (MB), a mobile, a Remote Station (RS), an Access Point (AP), a Remote Terminal (RT), an Access Terminal (AT), a User Terminal (UT), a User Agent (UA), a User Device (UD), User Equipment (UE), or the like.

The base station (for example, an access point) may refer to a device in communication with a wireless terminal via one or more sectors at an air interface in an access network. The base station may be configured to mutually convert a received over-the-air frame and an IP packet, and serve as a router between the wireless terminal and a rest portion of the access network, where the rest portion of the access network may include an Internet protocol (IP) network. The base station may coordinate attribute management of the air interface. For example, the base station may be a Base Transceiver Station (BTS) in GSM or CDMA, may be a NodeB in WCDMA, or may be an evolved NodeB (NodeB, eNB, or e-NodeB, evolutional Node B) in LTE, which is not limited in this application.

In addition, the terms "system" and "network" may be used interchangeably in this application. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In current technologies, a terminal device cannot send antenna information to a base station. On one hand, because a quantity of antennas on the terminal device is limited, there is no need to send the antenna information to the base station. On the other hand, there is no manner in which the terminal device sends the antenna information to the base station. With an increase in the quantity of antennas on the terminal device side, when scheduling the terminal device, the base station cannot effectively configure and schedule a resource for the terminal device because the base station does not know current antenna information of the terminal device side. As a result, quality of communication between the base station and the terminal device cannot be ensured. Therefore, to ensure quality of data transmission between the base station and the terminal device, the base station needs to obtain the antenna information of the terminal device, and determine, according to the antenna information, a resource for communicating with the terminal device, so as to properly schedule a channel resource for a communications service initiated by the terminal device, which improves a capability of communication between the terminal device and the base station.

The following describes the embodiments of the present invention in detail with reference to accompanying drawings. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiment 1

As shown in FIG. 1, FIG. 1 is a schematic structural diagram of an antenna information sending and receiving system according to Embodiment 1. The system includes a terminal device ii and a base station 12. The terminal device ii and the base station 12 are connected in a wireless manner.

The terminal device 11 is configured to: obtain antenna information of the terminal device, and send the antenna information to the base station 12.

The antenna information is used to represent a status of an antenna currently used by the terminal device.

The antenna information includes at least one of a maximum number of layers for uplink spatial multiplexing that are supported by the terminal device, an antenna number supported by the terminal device, information about whether the terminal device supports smart switch on/off of UE's antenna ports, or the like.

Specifically, the terminal device ii obtains the Maximum Number of Layers for Uplink Spatial Multiplexing that are supported.

For different terminal devices, maximum numbers of supported layers for uplink spatial multiplexing are different. For example, the maximum number of layers for uplink spatial multiplexing that are supported by the terminal device may be 1, 2, 4, 8, 16, or the like.

Optionally, in an initialization phase of the terminal device ii, the maximum number of layers for uplink spatial multiplexing that are supported by the terminal device is obtained according to a quantity of deployed antennas and a parameter of the deployed antenna.

The terminal device ii determines the supported antenna number. Different terminal devices support different antenna numbers. For example, the antenna number supported by the terminal device may be less than 8, greater than or equal to 8 but less than 16, greater than or equal to 16, or the like.

Optionally, because configuration performance of the terminal devices is different, the supported antenna numbers are different. In the initialization phase of the terminal device, the supported antenna number can be determined.

The terminal device ii determines whether smart switch on/off of UE's antenna ports is supported.

For different terminal devices, some terminal devices support smart switch on/off of UE's antenna ports, and some do not support smart switch on/off of UE's antenna ports. When determining whether smart switch on/off of UE's antenna ports is supported, the terminal device may determine, by using identifier information, whether smart switch on/off of UE's antenna ports is supported. For example, 1 indicates that smart switch on/off of UE's antenna ports is supported, and o indicates that smart switch on/off of UE's antenna ports is not supported.

The base station 12 is configured to: receive the antenna information sent by the terminal device 11; determine, according to the antenna information, a transmission resource for communicating with the terminal device; and communicate with the terminal device by using the transmission resource.

The antenna information is used to represent a status of an antenna currently used by the terminal device.

Specifically, N antennas (where N is an integer greater than 1) are configured for the terminal device 11, and the terminal device 11 sends data and receives data by using the N antennas.

M antennas (where M is an integer greater than 1) are configured for the base station 12, and the base station 12 communicates with one or more terminal devices 11 by using the M antennas.

Optionally, the terminal device 11 includes an antenna module 111, an antenna information management module 112, and an antenna information reporting module 113.

The antenna module in includes an antenna port switched on/off by the terminal device, and further stores parameter values such as a frequency band and a standing wave ratio that are supported by each switched-on antenna, and isolation between different antennas that are in a switched-on state.

The terminal device can trigger, according to a service requirement, switch on/off of the antenna port to control a quantity of antennas used by the terminal.

The antenna information management module 112 is configured to manage the antenna information of the terminal device.

Specifically, the antenna information management module 112 reads the antenna information of the terminal device from the antenna module 111; or when the antenna information of the terminal device in the antenna module in changes, triggers sending of changed antenna information to the antenna information management module 112.

Specifically, the antenna information is used to represent information about an antenna currently used by the terminal device, and specifically includes one or more of a quantity of currently switched-on antennas, a frequency band and a standing wave ratio that are supported by an antenna in a switched-on state, or isolation between different antennas that are in a switched-on state.

It should be noted that, that the antenna information management module obtains the antenna information of the terminal device from the antenna module may occur in real time, may periodically occur, may occur when an antenna information query message sent by the base station is received, or may occur when a terminal information query message sent by the base station is received, which is not limited herein.

The antenna information reporting module 113 is configured to report the antenna information, obtained by the antenna information management module 112, of the terminal device to the base station.

Specifically, a manner in which the antenna information reporting module 113 reports the antenna information, obtained by the antenna information management module, of the terminal device to the base station includes one or more of the following manners.

The antenna information reporting module 113 adds the antenna information, obtained by the antenna information management module, of the terminal device to Radio Resource Control (RRC) signaling, and sends the RRC signaling to the base station.

The antenna information reporting module 113 sends the antenna information, obtained by the antenna information management module, of the terminal device to the base station by using a Physical Uplink Shared Channel (PUSCH).

The antenna information reporting module 113 sends the antenna information, obtained by the antenna information management module, of the terminal device to the base station by using a physical random access channel.

It should be noted that, that the antenna information reporting module 113 reports the antenna information of the terminal device obtained by the antenna information management module to the base station may be sending the antenna information to the base station when the antenna information management module obtains the antenna information of the terminal device, may be sending the antenna information to the base station when the antenna information query message sent by the base station is received, or may be triggering, when the antenna information management module determines that the antenna information of the terminal device changes, the antenna information reporting module to send the antenna information to the base station, which is not specifically limited herein.

Optionally, the antenna information management module 112 is further configured to obtain current antenna information of the terminal device from the antenna module in.

The antenna information reporting module 113 is configured to send the current antenna information to the base station.

Specifically, the antenna information reporting module 113 is specifically configured to: when the antenna information management module 112 determines that the antenna information of the terminal device changes, send antenna information update information to the base station.

The antenna information update information is used to notify that the antenna information of the terminal device changes.

The terminal device 11 further includes a receiving module 114.

The receiving module 114 is configured to receive a capability query message sent by the base station, where the capability query message is used to request the terminal device to report capability information, and the capability information includes the antenna information of the terminal device.

Optionally, the capability information further includes transmission information of the terminal device. The transmission information is used to represent information that is of the terminal device and that is used to transmit data. The transmission information includes at least one or more of an uplink/downlink peak rate, a maximum uplink/downlink modulation, or a maximum number of layers for downlink spatial multiplexing.

Specifically, the transmission information includes at least one or more pieces of the following information:
 a downlink peak rate;
 an uplink peak rate;
 a maximum downlink modulation order;
 a maximum uplink modulation order; or
 a maximum number of layers for downlink spatial multiplexing.

The antenna information reporting module 113 is specifically configured to send the changed antenna information to the base station according to the capability query message.

Specifically, if the changed antenna information includes a changed antenna number, the antenna information reporting module 113 is specifically configured to send the changed antenna number to the base station.

Specifically, a manner in which the antenna information reporting module 113 sends the changed antenna number to the base station includes but is not limited to: sending a random access request to the base station, where the random access request carries the changed antenna number; or selecting a random access sequence corresponding to the changed antenna number, and initiating random access to the base station by using the random access sequence; or sending, by using the physical uplink shared channel PUSCH and in a specified manner, the changed antenna number to the base station after channel coding and interleaving are performed on the changed antenna number.

The base station 12 includes a receiving module 121, a demodulation module 122, a terminal capability management module 123, and a scheduling module 124.

The receiving module 121 is configured to receive the antenna information sent by the terminal device.

Specifically, a manner in which the receiving module 121 receives the antenna information sent by the terminal device includes but is not limited to the following.

A first manner: receiving the RRC signaling sent by the terminal device, where the RRC signaling carries the antenna information.

A second manner: receiving, by using the PUSCH, the antenna information sent by the terminal device.

A third manner: receiving the random access request sent by the terminal device, where the random access request carries the antenna information and is sent by using the physical random access channel.

The demodulation module 122 is configured to: parse the received antenna information to determine the current antenna information of the terminal device, and store, into the terminal capability management module 123, the current antenna information of the terminal device that is obtained by means of parsing.

The scheduling module 124 is configured to: obtain the current antenna information of the terminal device from the terminal capability management module 123, determine the transmission resource for communicating with the terminal device, and communicate with the terminal device by using the transmission resource.

The base station further includes a sending module 125, where the sending module 125 is configured to send the capability query message to the terminal device.

Optionally, the receiving module 121 is further configured to receive the changed antenna information sent by the terminal device. The changed antenna information is sent by the terminal device when the antenna information changes.

Specifically, the receiving module 121 is specifically configured to receive the antenna information update information sent by the terminal device. The antenna information update information is used to notify the base station that the antenna information changes.

The sending module 125 is further configured to send the antenna information query message to the terminal device.

The receiving module 121 is specifically configured to receive the changed antenna information sent by the terminal device.

If the changed antenna information includes the changed antenna number, a manner in which the receiving module 121 receives the changed antenna information sent by the terminal device includes: receiving the random access request sent by the terminal device, where the random access request carries the changed antenna number; or receiving the random access sequence sent by the terminal device, and determining the received changed antenna number of the terminal device according to a preset correspondence between a random access sequence and an antenna number; or receiving, by using the PUSCH, the antenna information sent by the terminal device .

It should be noted that the base station and the terminal device may establish in advance the correspondence between a random access sequence and an antenna number in a negotiation manner.

That is, if the changed antenna number of the terminal device is A, the terminal device initiates a random access request to the base station device, where the random access request includes a random access sequence corresponding to the antenna number A, and after receiving the random access sequence sent by the terminal device, the base station may determine the changed antenna number of the terminal according to the random access sequence.

By using the system in Embodiment 1, a terminal device obtains first antenna information of the terminal device, and sends the first antenna information to a base station. The first antenna information includes at least one or more of a maximum number of layers for uplink spatial multiplexing that are supported by the terminal device, an antenna number supported by the terminal device, or whether the terminal device supports smart switch on/off of UE's antenna ports. When receiving antenna information, the base station determines, according to the antenna information, a channel resource for communicating with the terminal device, and communicates with the terminal device by using the determined channel resource. In this way, the terminal device can control, according to a service requirement of the terminal device, an antenna deployed on the terminal device, and report antenna information of the terminal device to the base station in a timely manner. On one hand, the terminal device adaptively adjusts a quantity of used antennas, which effectively mitigates a problem of large power consumption and strong electromagnetic radiation of the terminal device caused by an increase in an antenna number. On the other hand, the base station can obtain the antenna information of the terminal device in a timely manner, determine quality of a channel between the base station and the terminal device according to the antenna information of the terminal device, and properly schedule a channel resource for a communications service initiated by the terminal device, which improves a capability of communication between the terminal device and the base station.

Embodiment 2

Figure 2:
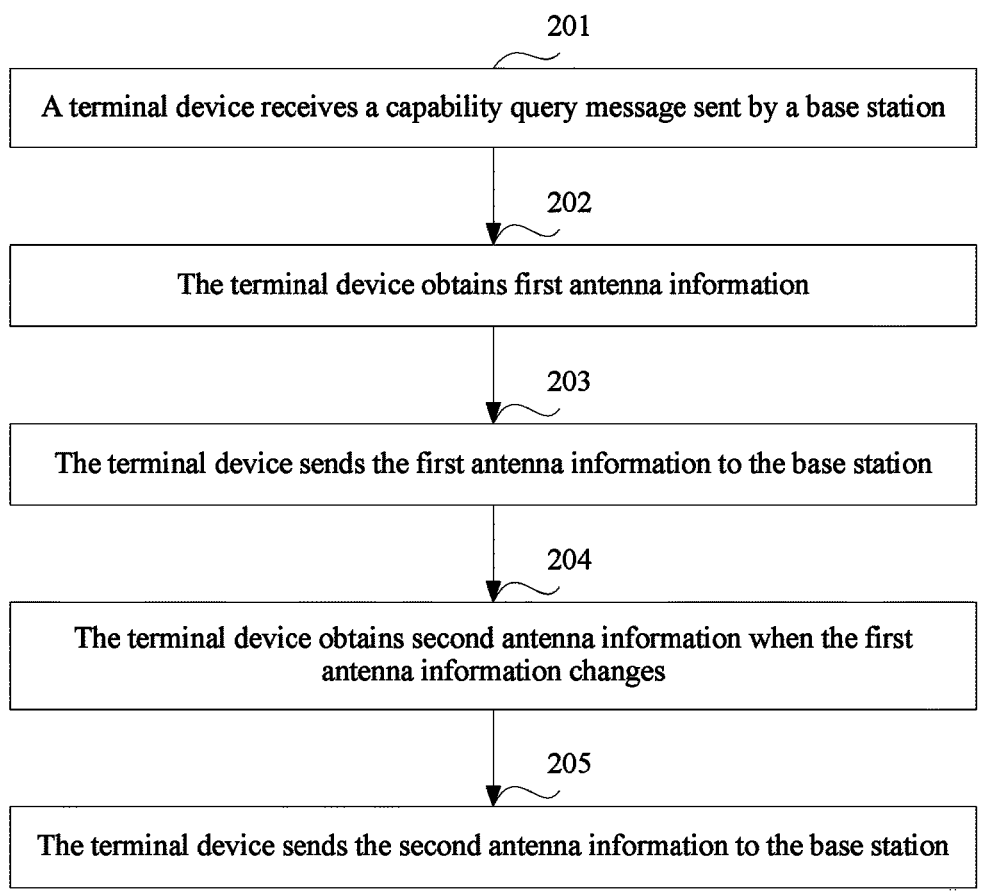
FIG. 2 is a schematic flowchart of an antenna information sending method according to Embodiment 2 of the present invention.

As shown in FIG. 2, FIG. 2 is a schematic flowchart of an antenna information sending method according to Embodiment 2. The method may be described as follows.

Step 201: A terminal device receives a capability query message sent by a base station.

The capability query message is used to request the terminal device to report antenna information and transmission information of the terminal.

The antenna information includes at least one of a maximum number of layers for uplink spatial multiplexing that are supported by the terminal device, an antenna number supported by the terminal device, or whether the terminal device supports smart switch on/off of UE's antenna ports.

The transmission information includes at least one of an uplink/downlink peak rate, a maximum uplink/downlink modulation, or a maximum number of layers for downlink spatial multiplexing.

In step 201, the transmission information includes at least one or more pieces of the following information:
a downlink peak rate;
an uplink peak rate;
a maximum downlink modulation order;
a maximum uplink modulation order; or
a maximum number of layers for downlink spatial multiplexing.

Step 202: The terminal device obtains first antenna information.

The first antenna information is used to represent information about an antenna currently used by the terminal device.

The first antenna information includes at least one or more of a maximum number of layers for uplink spatial multiplexing that are supported by the terminal device, an antenna number supported by the terminal device, or whether the terminal device supports smart switch on/off of UE's antenna ports.

The first antenna information is used by the base station to determine a transmission resource used for communicating with the terminal device.

In step 202, the terminal device obtains, from an antenna module inside the terminal device, the maximum number of layers for uplink spatial multiplexing that are supported by the terminal device. For different terminal devices, maximum numbers of supported layers for uplink spatial multiplexing are different. For example, the maximum number of layers for uplink spatial multiplexing that are supported by the terminal device may be 1, 2, 4, 8, 16, or the like.

The terminal device obtains, from the antenna module inside the terminal device, the antenna number supported by the terminal device. Different terminal devices support different antenna numbers. For example, the antenna number supported by the terminal device may be less than 8, greater than or equal to 8 but less than 16, greater than or equal to 16, or the like.

The terminal device obtains, from the antenna module inside the terminal device, information about whether the terminal device supports smart switch on/off of UE's antenna ports. For different terminal devices, some terminal devices support smart switch on/off of UE's antenna ports, and some do not support smart switch on/off of UE's antenna ports. When determining whether smart switch on/off of UE's antenna ports is supported, the terminal device may determine, by using identifier information, whether smart switch on/off of UE's antenna ports is supported. For example, 1 indicates that smart switch on/off of UE's antenna ports is supported, and o indicates that smart switch on/off of UE's antenna ports is not supported.

It should be noted that the maximum number of layers for uplink spatial multiplexing that are supported by the terminal device, the antenna number supported by the terminal device, and whether the terminal device supports smart switch on/off of UE's antenna ports may be stored in the antenna module of the terminal device in an initialization phase of the terminal device.

Specifically, the first antenna information includes at least one or more of a quantity of currently switched-on antennas, a frequency band and a standing wave ratio that are supported by an antenna in a switched-on state, or isolation between different antennas that are in a switched-on state.

That the terminal device obtains the antenna information from the antenna module inside the terminal device includes but is not limited to one or more of the following: determining whether the terminal device has a capability of smart switch on/off of UE's antenna ports; determining the quantity of currently switched-on antennas; determining the frequency band supported by the antenna in the switched-on state; determining a standing wave ratio of the antenna in the switched-on state on each frequency band; or determining the isolation between the different antennas that are in the switched-on state.

The Standing Wave Ratio (SWR) indicates an indicator of a degree to which a feeder matches the base station.

As shown in Table 1, it is assumed that the terminal device has six antennas that are in the switched-on state, and standing wave ratios that are of the six antennas and determined by the terminal device are as follows.

TABLE 1

|  | Antenna 1 | Antenna 2 | Antenna 3 | Antenna 4 | Antenna 5 | Antenna 6 |
| --- | --- | --- | --- | --- | --- | --- |
| Frequency band 1 | $SWR_{11}$ | $SWR_{12}$ | $SWR_{13}$ | $SWR_{14}$ | $SWR_{15}$ | $SWR_{16}$ |
| Frequency band 2 | $SWR_{21}$ | $SWR_{22}$ | $SWR_{23}$ | $SWR_{24}$ | $SWR_{25}$ | $SWR_{26}$ |
| Frequency band 3 | $SWR_{31}$ | $SWR_{32}$ | $SWR_{33}$ | $SWR_{34}$ | $SWR_{35}$ | $SWR_{36}$ |
| Frequency band 4 | $SWR_{41}$ | $SWR_{42}$ | $SWR_{43}$ | $SWR_{44}$ | $SWR_{45}$ | $SWR_{46}$ |

It should be noted that a sequence of performing step 201 and step 202 is not limited to the sequence in Embodiment 2. Step 202 may be performed before step 201 is performed, or step 201 and step 202 may be concurrently performed.

Optionally, step 201 may be implemented after step 203.

Step 203: The terminal device sends the first antenna information to the base station.

In step 203, a manner in which the terminal device sends the first antenna information to the base station includes but is not limited to the following manners.

Manner 1: The terminal device sends radio resource control RRC signaling to the base station, where the RRC signaling carries the first antenna information.

Manner 2: The terminal device sends the first antenna information to the base station by using a physical uplink shared channel PUSCH.

Manner 3: The terminal device sends the first antenna information to the base station by using a physical random access channel PRACH.

Step 204: The terminal device obtains second antenna information when the first antenna information changes.

Step 205: The terminal device sends the second antenna information to the base station.

In step 205, when the first antenna information of the terminal device changes, the terminal device sends an update message to the base station.

The update message is used to notify the base station that the antenna information of the terminal device changes.

Then the terminal device receives the capability query message sent by the base station.

Finally, the terminal device sends the second antenna information to the base station.

When receiving the second antenna information, the base station updates the antenna information of the terminal device that is stored in a local terminal capability management module.

Optionally, the second antenna information includes a changed antenna number. In this case, a manner in which the terminal device sends the second antenna information to the base station includes but is not limited to the following.

Manner 1: The terminal device sends a random access request to the base station, where the random access request carries the changed antenna number.

Manner 2: The terminal device sends random access to the base station, where the random access includes a random access sequence, and the random access sequence is determined according to the changed antenna number.

It should be noted that the terminal device and the base station configure a correspondence between a random access sequence and a number of a quantity of switched-on antennas for the terminal device by means of negotiation or the base station configures a correspondence between a random access sequence and a number of a quantity of switched-on antennas for the terminal device according to a requirement. When determining that the antenna number changes, the terminal device determines the random access sequence by using the changed antenna number, and initiates random access to the base station by using the random access sequence. In this way, the base station may determine the changed antenna number of the terminal device according to the received random access sequence.

Manner 3: The changed antenna number is sent to the base station in a specified manner by using the physical uplink shared channel PUSCH.

Specifically, in a first step, the terminal device performs channel coding on uplink transmission data and a Cyclic Redundancy Check (CRC) code, and performs, in a manner such as puncturing or padding, rate matching on data obtained after a channel coding is performed, to obtain a quantity of bits that matches a physical channel.

It should be noted that a channel coding manner includes but is not limited to: a convolutional code manner, a Low-density parity-check (LDPC) code manner, or the like.

In a second step, the terminal device converts the changed antenna number into a binary number, and performs channel coding on the binary number to obtain a bit corresponding to the changed antenna number.

It should be noted that a manner of performing channel coding on the binary number includes but is not limited to: a convolutional code manner, a linear coding manner, or the like.

For example, typically, a quantity of switched-on antennas of the terminal device includes 1, 2, 4, 8, 12, 16, or the like. If the quantity of switched-on antennas of the terminal device is expressed by using a 5-bit binary number: 00001 indicates that one antenna is switched on; 00010 indicates that two antennas are switched on; 00100 indicates that four antennas are switched on; 01000 indicates that eight antennas are switched on; 01100 indicates that 12 antennas are switched on; and 10000 indicates that 16 antennas are switched on.

In a third step, the terminal device multiplexes the bit obtained after rate matching is performed on the uplink data and the bit corresponding to the changed antenna number, and performs channel interleaving on the multiplexed bits.

In a fourth step, the terminal device sends a channel interleaving result to the base station by using the PUSCH.

By using the solution of Embodiment 2, first antenna information of a terminal device is obtained, where the first antenna information includes at least one or more of a maximum number of layers for uplink spatial multiplexing that are supported by the terminal device, an antenna number supported by the terminal device, or whether the terminal device supports smart switch on/off of UE's antenna ports; and the first antenna information is sent to a base station. In this way, the terminal device can control, according to a service requirement of the terminal device, an antenna deployed on the terminal device, and report antenna information of the terminal device to the base station in a timely manner. On one hand, the terminal device adaptively adjusts a quantity of used antennas, which effectively mitigates a problem of large power consumption and strong electromagnetic radiation of the terminal device caused by an increase in an antenna number. On the other hand, the base station can obtain the antenna information of the terminal device in a timely manner, determine quality of a channel between the base station and the terminal device according to the antenna information of the terminal device, and properly schedule a channel resource for a communications service initiated by the terminal device, which improves a capability of communication between the terminal device and the base station.

Embodiment 3

Figure 3:
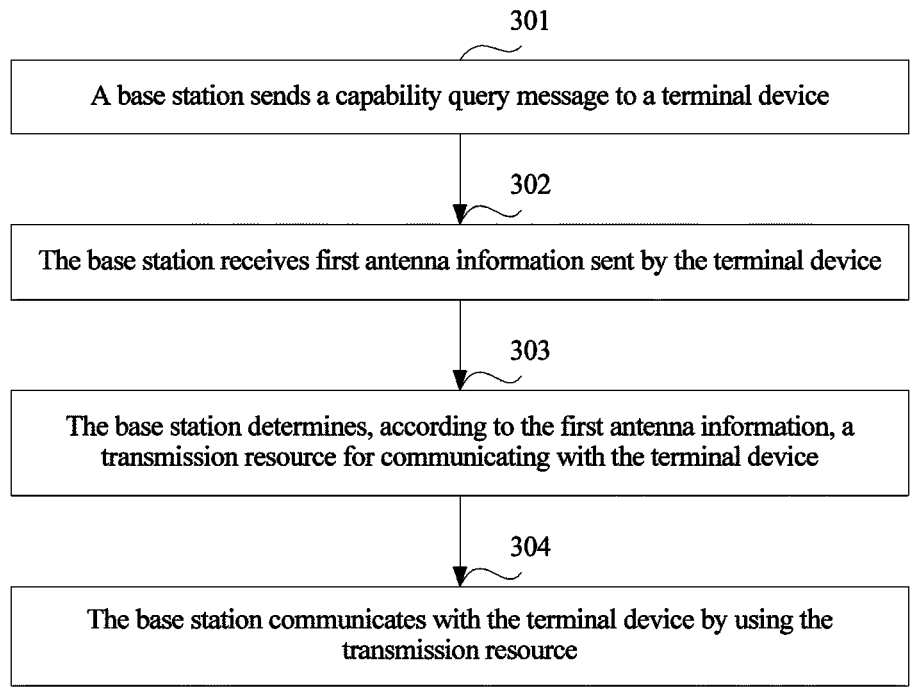
FIG. 3 is a schematic flowchart of an antenna information receiving method according to Embodiment 3 of the present invention.

As shown in FIG. 3, FIG. 3 is a schematic flowchart of an antenna information receiving method according to Embodiment 3. The method may be described as follows.

Step 301: A base station sends a capability query message to a terminal device.

The capability query message is used to request the terminal device to report capability information that includes first antenna information and transmission information.

Optionally, the transmission information is used to represent information that is of the terminal device and that is used to transmit data, and the information includes at least one or more of an uplink/downlink peak rate, a maximum uplink/downlink modulation, or a maximum number of layers for downlink spatial multiplexing.

Specifically, the transmission information includes at least one or more pieces of the following information:
a downlink peak rate;
an uplink peak rate;
a maximum downlink modulation order;
a maximum uplink modulation order; or
a maximum number of layers for downlink spatial multiplexing.

Step 302: The base station receives first antenna information sent by the terminal device.

The antenna information is used to represent information about an antenna currently used by the terminal device.

The antenna information includes at least one of a maximum number of layers for uplink spatial multiplexing that are supported by the terminal device, an antenna number supported by the terminal device, or information about whether the terminal device supports smart switch on/off of UE's antenna ports.

Specifically, the antenna information includes at least one of a quantity of currently switched-on antennas, a frequency band and a standing wave ratio that are supported by an antenna in a switched-on state, or isolation between different antennas that are in a switched-on state.

In step 302, a manner in which the base station receives the antenna information sent by the terminal device includes but is not limited to the following.

Manner 1: receiving radio resource control RRC signaling sent by the terminal device, where the RRC signaling carries the first antenna information.

Manner 2: receiving, by using a physical uplink shared channel PUSCH, the first antenna information sent by the terminal device.

Manner 3: receiving a random access request sent by the terminal device, and obtaining, by using a physical random access channel PRACH, the first antenna information sent by the terminal device.

Optionally, the method further includes receiving second antenna information sent by the terminal device.

The second antenna information is sent by the terminal device when the first antenna information changes.

Specifically, update information sent by the terminal device is received.

The update information is used to notify the base station that the antenna information of the terminal device changes.

The base station sends the capability query message to the terminal device, and receives the second antenna information sent by the terminal device.

If the second antenna information includes a changed antenna number, a manner in which the base station receives the second antenna information sent by the terminal device includes but is not limited to:

Manner 1: receiving a random access request sent by the terminal device, where the random access request carries the changed antenna number.

Manner 2: receiving a random access sequence sent by the terminal device, and determining, according to a preset correspondence between a random access sequence and an antenna number, the changed antenna number that is of the terminal device and corresponding to the received random sequence.

Manner 3: receiving, by using the physical uplink shared channel PUSCH, the changed antenna number sent by the terminal device.

Optionally, the base station receives the transmission information that is of the terminal device and sent by the terminal device.

Step 303: The base station determines, according to the first antenna information, a transmission resource for communicating with the terminal device.

Step 304: The base station communicates with the terminal device by using the transmission resource.

Embodiment 4

Figure 4:
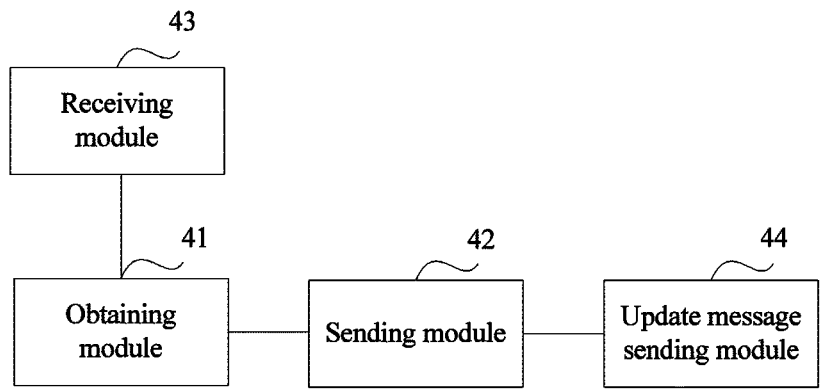
FIG. 4 is a schematic structural diagram of an antenna information sending device according to Embodiment 4 of the present invention.

As shown in FIG. 4, FIG. 4 is a schematic structural diagram of an antenna information sending device according to Embodiment 4 of the present invention. The device includes an obtaining module 41 and a sending module 42.

The obtaining module 41 is configured to obtain first antenna information, where the first antenna information includes at least one of a maximum number of layers for uplink spatial multiplexing that are supported by the terminal device, an antenna number supported by the terminal device, or whether the terminal device supports smart switch on/off of UE's antenna ports.

The sending module 42 is configured to send the first antenna information to a base station, where the first antenna information is used by the base station to determine a transmission resource used for communicating with the terminal device.

Optionally, the sending device further includes a receiving module 43.

The receiving module 43 is configured to receive a capability query message sent by the base station, where the capability query message is used to request the terminal device to report capability information that includes the first antenna information.

Optionally, the capability information further includes transmission information.

The obtaining module 41 is further configured by the terminal device to obtain the transmission information, where the transmission information includes at least one of an uplink/downlink peak rate, a maximum uplink/downlink modulation, or a maximum number of layers for downlink spatial multiplexing.

The sending module 42 is further configured to send the transmission information to the base station.

Specifically, the sending module 42 is specifically configured to send radio resource control RRC signaling to the base station, where the RRC signaling carries the first antenna information.

The sending module 42 is specifically configured to send the first antenna information to the base station by using a physical uplink shared channel PUSCH.

The sending module 42 is specifically configured to send the first antenna information to the base station by using a physical random access channel PRACH.

Optionally, the obtaining module 41 is further configured to obtain changed second antenna information when the first antenna information changes.

The sending module 42 is further configured to send the second antenna information to the base station.

Optionally, the sending device further includes an update message sending module 44.

The update message sending module 44 is configured to: before the second antenna information is sent to the base station, send an update message to the base station when the first antenna information changes, where the update message is used to notify the base station that antenna information of the terminal device changes.

Specifically, the second antenna information includes a changed antenna number.

The sending module 42 is specifically configured to: send a random access request to the base station, where the random access request carries the changed antenna number; or send random access to the base station, where the random access includes a random access sequence, and the random access sequence is determined according to the changed antenna number; or send the changed antenna number to the base station in a specified manner by using the physical uplink shared channel PUSCH.

It should be noted that the sending device described in Embodiment 4 of the present invention may be the terminal device.

A terminal device can control, according to a service requirement of the terminal device, an antenna deployed on the terminal device, and report antenna information of the terminal device to a base station in a timely manner. On one hand, the terminal device adaptively adjusts a quantity of used antennas, which effectively mitigates a problem of large power consumption and strong electromagnetic radiation of the terminal device caused by an increase in an antenna number. On the other hand, the base station can obtain the antenna information of the terminal device in a timely manner, determine quality of a channel between the base station and the terminal device according to the antenna information of the terminal device, and properly schedule a channel resource for a communications service initiated by the terminal device, which improves a capability of communication between the terminal device and the base station.

Embodiment 5

Figure 5:
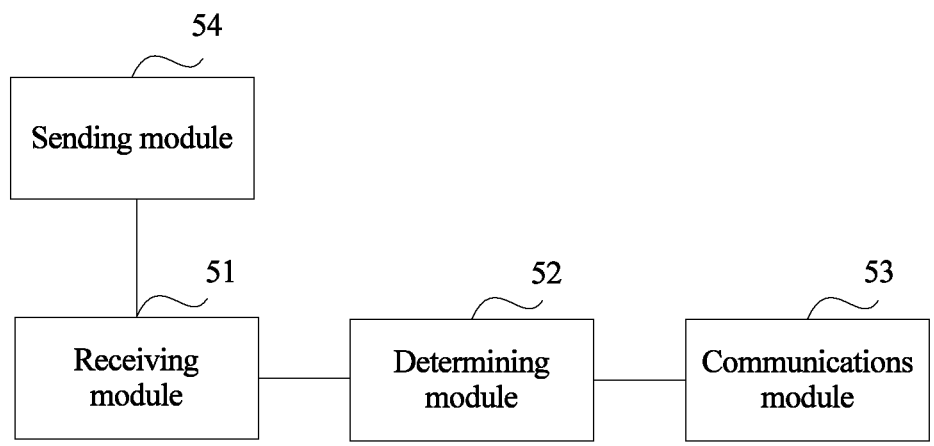
FIG. 5 is a schematic structural diagram of an antenna information receiving device according to Embodiment 5 of the present invention.

As shown in FIG. 5, FIG. 5 is a schematic structural diagram of an antenna information receiving device according to Embodiment 5. The receiving device includes a receiving module 51, a determining module 52, and a communications module 53.

The receiving module 51 is configured to receive first antenna information sent by a terminal device, where the first antenna information includes at least one of a maximum number of layers for uplink spatial multiplexing that are supported by the terminal device, an antenna number supported by the terminal device, or whether the terminal device supports smart switch on/off of UE's antenna ports.

The determining module 52 is configured to determine, according to the received first antenna information, a transmission resource used for communicating with the terminal device.

The communications module 53 is configured to communicate with the terminal device by using the transmission resource.

Optionally, the receiving device further includes a sending module 54.

The sending module 54 is configured to send a capability query message to the terminal device, where the capability query message is used to request the terminal device to report capability information that includes the first antenna information.

Optionally, the capability information further includes transmission information of the terminal device.

The receiving module 51 is further configured to receive the transmission information sent by the terminal device, where the transmission information includes at least one of an uplink/downlink peak rate, a maximum uplink/downlink modulation, or a maximum number of layers for downlink spatial multiplexing.

Specifically, the receiving module 51 is specifically configured to receive radio resource control RRC signaling sent by the terminal device, where the RRC signaling carries the first antenna information.

The receiving module 51 is specifically configured to receive, by using a physical uplink shared channel PUSCH, the first antenna information sent by the terminal device.

The receiving module 51 is specifically configured to: receive a random access request sent by the terminal device, and obtain, by using a physical random access channel PRACH, the first antenna information sent by the terminal device.

Optionally, the receiving module 51 is further configured to receive second antenna information sent by the terminal device, where the second antenna information is sent by the terminal device when the first antenna information changes.

The receiving module 51 is specifically configured to receive update information sent by the terminal device, where the update information is used to notify the base station that antenna information of the terminal device changes.

The sending module is further configured to send the capability query message to the terminal device.

Specifically, the second antenna information includes a changed antenna number.

The receiving module 51 is specifically configured to: receive a random access request sent by the terminal device, where the random access request carries the changed antenna number; or receive random access sent by the terminal device, where the random access includes a random access sequence, and the random access sequence is determined according to the changed antenna number; or receive, by using the physical uplink shared channel PUSCH, the changed antenna number sent by the terminal device.

It should be noted that the receiving device described in Embodiment 5 of the present invention may be the base station device.

Embodiment 6

Figure 6:
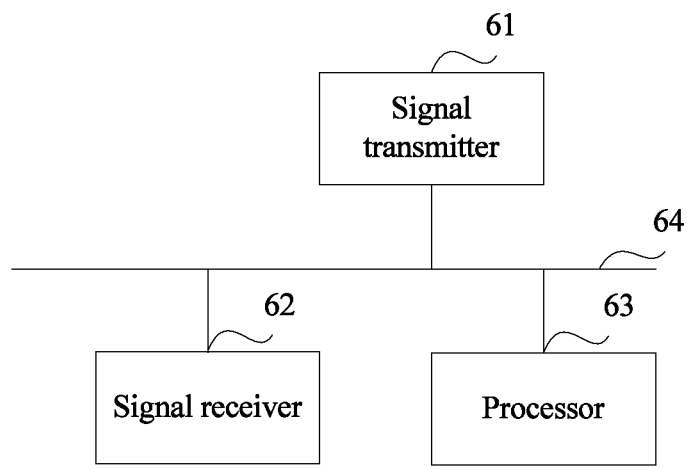
FIG. 6 is a schematic structural diagram of an antenna information sending device according to Embodiment 6 of the present invention.

As shown in FIG. 6, FIG. 6 is a schematic structural diagram of an antenna information sending device according to Embodiment 6. The sending device has a function of executing Embodiment 1 to Embodiment 3. The sending device may use a structure of a general computer system, and the computer system may be specifically a processor-based computer. The sending device entity includes a signal transmitter 61, a signal receiver 62, and at least one processor 63. The signal transmitter 61, the signal receiver 62, and the at least one processor 63 are connected by using a bus 64.

The processor 63 may be a general central processing unit (CPU), a microprocessor, an application-specific integrated circuit (ASIC), or one or more integrated circuits that are configured to control program execution of the solutions of the present invention.

The processor 63 is configured to obtain first antenna information, where the first antenna information includes at least one of a maximum number of layers for uplink spatial multiplexing that are supported by the terminal device, an antenna number supported by the terminal device, or whether the terminal device supports smart switch on/off of UE's antenna ports.

The signal transmitter 61 is configured to send the first antenna information to a base station, where the first antenna information is used by the base station to determine a transmission resource used for communicating with the terminal device.

The signal receiver 62 is configured to receive a capability query message sent by the base station, where the capability query message is used to request the terminal device to report capability information that includes the first antenna information.

Optionally, the capability information further includes transmission information.

The processor 63 is further configured to obtain the transmission information, where the transmission information includes at least one of an uplink/downlink peak rate, a maximum uplink/downlink modulation, or a maximum number of layers for downlink spatial multiplexing.

The signal transmitter 61 is further configured to send the transmission information to the base station.

The signal transmitter 61 is specifically configured to send radio resource control RRC signaling to the base station, where the RRC signaling carries the first antenna information.

The signal transmitter 61 is specifically configured to send the first antenna information to the base station by using a physical uplink shared channel PUSCH.

The signal transmitter 61 is specifically configured to send the first antenna information to the base station by using a physical random access channel PRACH.

The processor 63 is further configured to obtain changed second antenna information when the first antenna information changes.

The signal transmitter 61 is further configured to send the second antenna information to the base station.

The signal transmitter 61 is further configured to: before the second antenna information is sent to the base station, send an update message to the base station when the first antenna information changes, where the update message is used to notify the base station that antenna information of the terminal device changes.

Optionally, the second antenna information includes a changed antenna number.

The signal transmitter 61 is specifically configured to: send a random access request to the base station, where the random access request carries the changed antenna number; or send random access to the base station, where the random access includes a random access sequence, and the random access sequence is determined according to the changed antenna number; or send the changed antenna number to the base station in a specified manner by using the physical uplink shared channel PUSCH.

It should be noted that the sending device described in Embodiment 6 may be the terminal device.

Embodiment 7

Figure 7:
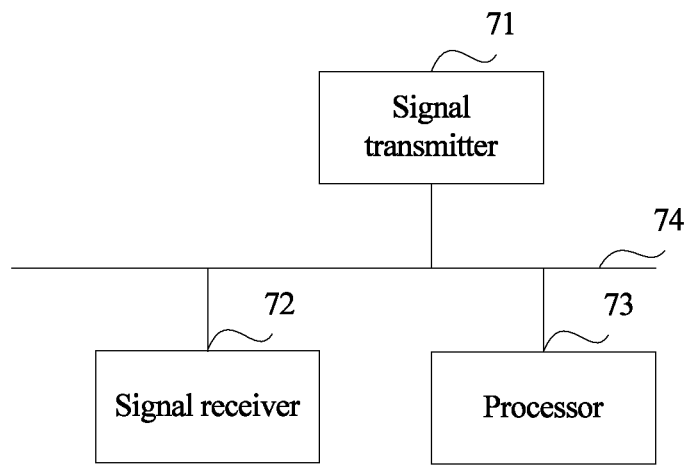
FIG. 7 is a schematic structural diagram of an antenna information receiving device according to Embodiment 7 of the present invention.

As shown in FIG. 7, FIG. 7 is a schematic structural diagram of an antenna information receiving device according to Embodiment 7. The receiving device has a function of executing Embodiment 1 to Embodiment 3. The receiving device may use a structure of a general computer system, and the computer system may be specifically a processor-based computer. The receiving device entity includes a signal transmitter 71, a signal receiver 72, and at least one processor 73. The signal transmitter 71, the signal receiver 72, and the at least one processor 73 are connected by using a bus 74.

The processor 73 may be a general central processing unit (CPU), a microprocessor, an application-specific integrated circuit (ASIC), or one or more integrated circuits that are configured to control program execution of the solutions of the present invention.

The signal receiver 72 is configured to receive first antenna information sent by a terminal device, where the first antenna information includes at least one of a maximum number of layers for uplink spatial multiplexing that are supported by the terminal device, an antenna number supported by the terminal device, or whether the terminal device supports smart switch on/off of UE's antenna ports.

The processor 73 is configured to: determine, according to the received first antenna information, a transmission resource used for communicating with the terminal device; and communicate with the terminal device by using the transmission resource.

Optionally, the receiving device further includes a signal sending module 71.

The signal sending module 71 is configured to send a capability query message to the terminal device, where the capability query message is used to request the terminal device to report capability information that includes the first antenna information.

Optionally, the capability information further includes transmission information of the terminal device.

The signal receiver 72 is further configured to receive the transmission information sent by the terminal device, where the transmission information includes at least one of an uplink/downlink peak rate, a maximum uplink/downlink modulation, or a maximum number of layers for downlink spatial multiplexing.

The signal receiver 72 is specifically configured to receive radio resource control RRC signaling sent by the terminal device, where the RRC signaling carries the first antenna information.

The signal receiver 72 is specifically configured to receive, by using a physical uplink shared channel PUSCH, the first antenna information sent by the terminal device.

The signal receiver 72 is specifically configured to: receive a random access request sent by the terminal device, and obtain, by using a physical random access channel PRACH, the first antenna information sent by the terminal device.

The signal receiver 72 is further configured to receive second antenna information sent by the terminal device, where the second antenna information is sent by the terminal device when the first antenna information changes.

The signal receiver 72 is further configured to receive update information sent by the terminal device, where the update information is used to notify the base station that antenna information of the terminal device changes; and send the capability query message to the terminal device.

Optionally, the second antenna information includes a changed antenna number.

The signal receiver 72 is specifically configured to: receive a random access request sent by the terminal device, where the random access request carries the changed antenna number; or receive random access sent by the terminal device, where the random access includes a random access sequence, and the random access sequence is determined according to the changed antenna number; or receive, by using the physical uplink shared channel PUSCH, the changed antenna number sent by the terminal device.

It should be noted that the receiving device described in Embodiment 7 may be the base station device.

A terminal device can control, according to a service requirement of the terminal device, an antenna deployed on the terminal device, and report antenna information of the terminal device to a base station in a timely manner. On one hand, the terminal device adaptively adjusts a quantity of used antennas, which effectively mitigates a problem of large power consumption and strong electromagnetic radiation of the terminal device caused by an increase in an antenna number. On the other hand, the base station can obtain the antenna information of the terminal device in a timely manner, determine quality of a channel between the base station and the terminal device according to the antenna information of the terminal device, and properly schedule a channel resource for a communications service initiated by the terminal device, which improves a capability of communication between the terminal device and the base station.

A person skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A device, comprising:
    a processor, configured to obtain first antenna information, wherein the first antenna information comprises: an indication of whether the device supports smart switch on/off of a user equipment's antenna ports; and
    a signal transmitter, configured to send the first antenna information to a base station, wherein the first antenna information is used by the base station to determine a transmission resource used for communicating with the device, and wherein the first antenna information is carried in radio resource control (RRC) signaling from the device to the base station.

2. The device according to claim 1, wherein the device further comprises:

a signal receiver, configured to receive a capability query message sent by the base station, wherein the capability query message requests the device to report capability information that comprises the first antenna information.

3. The device according to claim 2, wherein the capability information further comprises transmission information;
wherein the processor is further configured to obtain the transmission information, wherein the transmission information comprises: an uplink/downlink peak rate, a maximum uplink/downlink modulation order, a maximum number of layers for downlink spatial multiplexing, a maximum number of layers for uplink spatial multiplexing that are supported by the device, or an antenna number supported by the device; and
wherein the signal transmitter is further configured to send the transmission information to the base station.

4. The device according to claim 1, wherein:
the processor is further configured to obtain changed antenna information as second antenna information when the first antenna information changes; and
the signal transmitter is further configured to send the second antenna information to the base station.

5. The device according to claim 4, wherein the signal transmitter is further configured to:
before the second antenna information is sent to the base station, send an update message to the base station when the first antenna information changes, wherein the update message notifies the base station that the first antenna information of the device has changed.

6. A device, comprising:
a signal receiver, configured to receive first antenna information sent by a terminal device, wherein the first antenna information comprises: an indication of whether the terminal device supports smart switch on/off of a user equipment's (UE's) antenna ports, wherein the first antenna information is carried in radio resource control (RRC) signaling sent from the terminal device to the device; and
a processor, configured to:
determine, according to the received first antenna information, a transmission resource used for communicating with the terminal device; and
communicate with the terminal device by using the transmission resource.

7. The device according to claim 6, further comprising a transmitter, wherein:
the transmitter is configured to send a capability query message to the terminal device, wherein the capability query message requests the terminal device to report capability information that comprises the first antenna information.

8. The device according to claim 7, wherein the capability information further comprises transmission information of the terminal device; and
wherein the signal receiver is further configured to receive the transmission information sent by the terminal device, wherein the transmission information comprises: an uplink/downlink peak rate, a maximum uplink/downlink modulation, a maximum number of layers for downlink spatial multiplexing, a maximum number of layers for uplink spatial multiplexing that are supported by the terminal device, or an antenna number supported by the terminal device.

9. A method, comprising:
obtaining, by a terminal device, first antenna information, wherein the first antenna information comprises: an indication of whether the terminal device supports smart switch on/off of a user equipment's (UE's) antenna ports; and
sending, by the terminal device, the first antenna information to a base station, wherein the first antenna information is used by the base station to determine a transmission resource used for communicating with the terminal device, and wherein the first antenna information is carried in radio resource control (RRC) signaling sent from the terminal device to the base station.

10. The method according to claim 9, further comprising:
receiving, by the terminal device, a capability query message sent by the base station, wherein the capability query message requests the terminal device to report capability information that comprises the first antenna information.

11. The method according to claim 10, wherein the capability information further comprises transmission information; and
wherein the method further comprises:
obtaining, by the terminal device, the transmission information, wherein the transmission information comprises an uplink/downlink peak rate, a maximum uplink/downlink modulation order, a maximum number of layers for downlink spatial multiplexing, a maximum number of layers for uplink spatial multiplexing that are supported by the terminal device, or an antenna number supported by the terminal device; and
sending, by the terminal device, the transmission information to the base station.

12. The method according to claim 9, further comprising:
obtaining, by the terminal device, changed antenna information as second antenna information when the first antenna information of the terminal device changes; and
sending the second antenna information to the base station.

13. The method according to claim 12, wherein, before sending the second antenna information to the base station, the method further comprises:
sending, by the terminal device, an update message to the base station when the first antenna information of the terminal device changes, wherein the update message notifies the base station that the first antenna information of the terminal device has changed.

14. A method, comprising:
receiving first antenna information sent by a terminal device, wherein the first antenna information comprises an indication of whether the terminal device supports smart switch on/off of a user equipment's (UE's) antenna ports, and wherein the first antenna information is carried in radio resource control (RRC) signaling sent from the terminal device;
determining, according to the received first antenna information, a transmission resource used for communicating with the terminal device; and
communicating with the terminal device by using the transmission resource.

15. The method according to claim 14, further comprising:
sending a capability query message to the terminal device, wherein the capability query message requests the terminal device to report capability information that comprises the first antenna information.

16. The method according to claim 15, wherein the capability information further comprises transmission information of the terminal device; and wherein the method further comprises:

receiving the transmission information sent by the terminal device, wherein the transmission information comprises an uplink/downlink peak rate, a maximum uplink/downlink modulation order, a maximum number of layers for downlink spatial multiplexing, a maximum number of layers for uplink spatial multiplexing that are supported by the terminal device, or an antenna number supported by the terminal device.

* * * * *